(12) United States Patent
Kheraluwala et al.

(10) Patent No.: US 8,614,870 B2
(45) Date of Patent: Dec. 24, 2013

(54) ACTIVE TRANSIENT CURRENT CONTROL IN ELECTRONIC CIRCUIT BREAKERS

(75) Inventors: Mustansir Kheraluwala, Lake Zurich, IL (US); Huazhen Chai, Caledonia, IL (US); Jeffrey T. Wavering, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 377 days.

(21) Appl. No.: 13/006,509

(22) Filed: Jan. 14, 2011

(65) Prior Publication Data
US 2012/0182656 A1    Jul. 19, 2012

(51) Int. Cl.
*H02H 3/08* (2006.01)
(52) U.S. Cl.
USPC .......................................................... 361/63
(58) Field of Classification Search
None
See application file for complete search history.

(56) References Cited

U.S. PATENT DOCUMENTS

| | | | |
|---|---|---|---|
| 5,392,188 A | 2/1995 | Epstein | |
| 5,467,242 A | 11/1995 | Kiraly | |
| 5,510,943 A | 4/1996 | Fukunaga | |
| 5,710,508 A | 1/1998 | Watanabe | |
| 6,097,582 A | 8/2000 | John et al. | |
| 6,470,224 B1 | 10/2002 | Drake et al. | |
| 6,768,622 B2 | 7/2004 | Hennig et al. | |
| 7,626,797 B2 | 12/2009 | Kilroy et al. | |
| 7,626,798 B2 * | 12/2009 | Rusan et al. | 361/93.6 |
| 7,656,633 B2 | 2/2010 | Kilroy et al. | |
| 7,656,634 B2 | 2/2010 | Robertson et al. | |
| 8,148,848 B2 * | 4/2012 | Rusan et al. | 307/82 |
| 2003/0212513 A1 * | 11/2003 | Vandevanter et al. | 702/57 |
| 2004/0130837 A1 * | 7/2004 | Papallo et al. | 361/60 |
| 2007/0177322 A1 | 8/2007 | Jacobs | |
| 2009/0168278 A1 * | 7/2009 | Landry | 361/56 |
| 2012/0026636 A1 * | 2/2012 | Chai et al. | 361/93.9 |

* cited by examiner

*Primary Examiner* — Rexford Barnie
*Assistant Examiner* — Angela Brooks
(74) *Attorney, Agent, or Firm* — Carlson, Gaskey & Olds P.C.

(57) ABSTRACT

A system and method for operating a semi-conductor based circuit breaker as a transient current limiter includes a semi-conductor switch that operates in a linear mode during a transient event and thereby reduces the transient current passing through the switch.

23 Claims, 3 Drawing Sheets

US 8,614,870 B2

ACTIVE TRANSIENT CURRENT CONTROL IN ELECTRONIC CIRCUIT BREAKERS

BACKGROUND

The present application is directed to incorporation of active transient current control in electronic circuit breakers, such as chip-on-busbar technology, for aerospace power distribution systems. Conventional systems using electromechanical type circuit breakers incorporate the active inrush current limiting in each of the attached loads, such as motor controllers for the various compressors, fans, pumps, etc.

Power distribution systems are used in aircraft, as well as other vehicles, to distribute electrical power from a common source, such as a power generator, to multiple different electronic systems each having different power requirements. As is typical in electrical systems, switching on an attached load can cause an undesirable spike in electrical current flowing from a power bus in the power distribution system to the load. This initial current spike is either referred to as a transient current, or an in-rush current from load stand point, or out-rush from Circuit Breaker stand point.

In order to reduce the impact these transient currents have on the attached electronics (loads) in a conventional system using electromechanical circuit breakers, each of the loads includes a transient current limiter that reduces inrush current to an acceptable level.

SUMMARY

Disclosed is an active control method for controlling transient currents using a semi-conductor switch/circuit breaker operating in a linear mode.

Also disclosed is a bus-mounted circuit breaker having a semi-conductor switch capable of operating in an off mode, a linear mode, and an on mode. The bus-mounted circuit breaker also includes a controller that is electrically coupled to a control input of the semi-conductor switch. The semi-conductor switch interruptably connects a power input and a power output.

Also disclosed is a power distribution system having a power bus, at least one power distribution branch for providing power from the power bus to an electrical system, a semi-conductor based circuit breaker mounted directly to the power bus and interruptably connecting the power distribution branch to the power bus, and a controller capable of controlling the semi-conductor based circuit breaker module in an off mode, a linear mode, and an on mode. The semi-conductor based circuit breaker additionally has a current limiting module such that the semi-conductor can further operate as a current limiter.

BRIEF DESCRIPTION OF THE DRAWINGS

The disclosure can be further understood by reference to the following detailed description when considered in connection with the accompanying drawings wherein.

DETAILED DESCRIPTION

Figure 1:
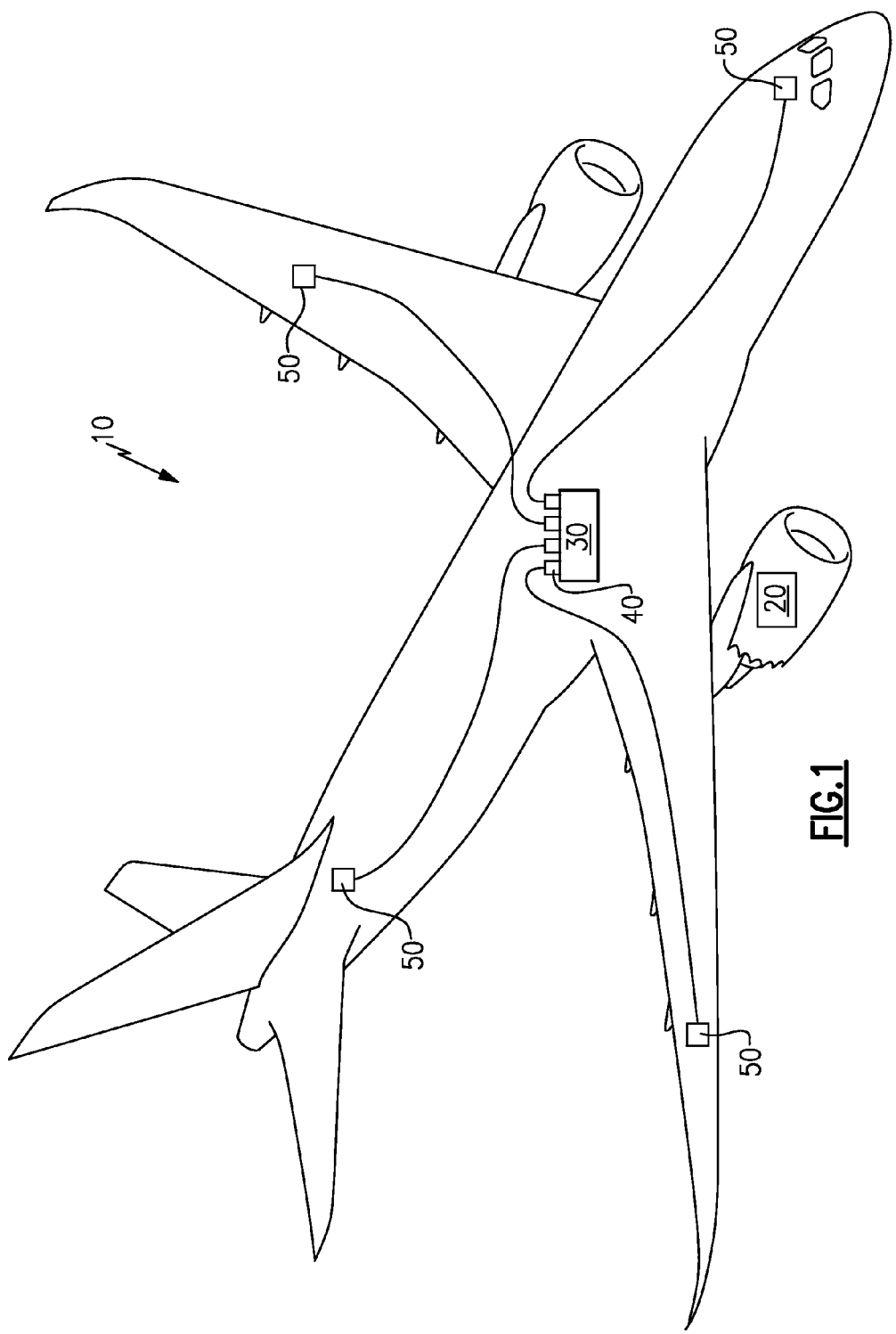
FIG. 1 illustrates an example aircraft power distribution system.

Typical vehicle power distribution systems utilize a centralized power source, such as an engine, and a power bus to distribute generated power to multiple different electronic systems (loads). One such system, for use in an aircraft 10, is illustrated in FIG. 1. The aircraft 10 includes a generator 20 that generates power using the rotation of the aircraft's engine according to known principles. The generator 20 transmits the power to a power bus 30, which distributes power to various loads 50 throughout the aircraft 10. To further facilitate the power distribution, the power bus 30 includes multiple bus-mounted on-board circuit breakers 40.

Figure 2:
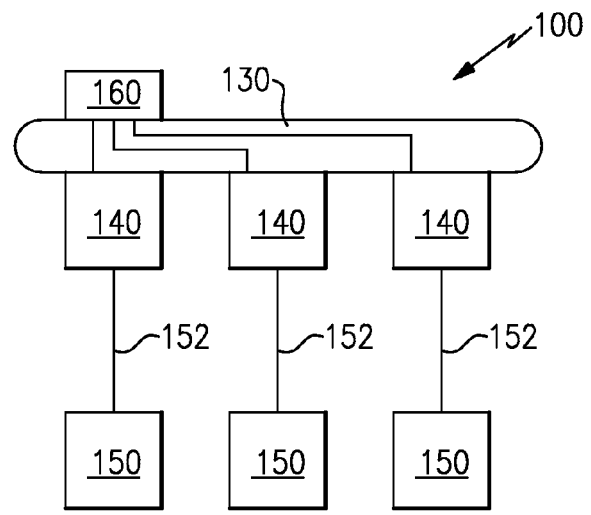
FIG. 2 schematically illustrates a power distribution system that can be used in the example FIG. 1.

The bus-mounted on-board circuit breakers 40 are bus mounted semi-conductor switches (or semi-conductor switch networks) that are controlled by a controller 160. FIG. 2 presents a schematic illustration of a power distribution system 100 that can be used in the aircraft 10 of FIG. 1. The example power distribution system of FIG. 2 can alternately be used in any power distribution system utilizing bus-mounted on-board circuit breakers. As illustrated in FIG. 2, multiple bus-mounted on-board circuit breakers 140 are attached directly to the power bus 130 according to known techniques. Power is transmitted through the bus-mounted on-board circuit breakers 140 to the distributed electrical loads 150. In typical power distribution systems, electromechanical circuit breakers are used and are not directly mounted to the bus. In addition to the electro-mechanical circuit breakers, typical power distribution systems also require a transient current limiter in each of the attached loads 150 in order to protect the loads 150 from transient currents.

Utilizing bus-mounted on-board circuit breakers 140, as in the example of FIG. 2, allows the semi-conductor portion of the bus-mounted on-board circuit breaker 140 to provide the additional function of transient current limiting, with the addition of minimal control components. Using the semiconductor portion of the bus-mounted on-board circuit breaker 140 as a transient current limiter allows the transient current limiting function to be performed on the bus side of the system rather than in each of the attached loads 150, thereby allowing each of the loads 150 to be designed without an included transient current limiter. Shifting the current limiting function to use preexisting components reduces overall weight and cost, as well as recognizing efficiency gains.

The power bus 130 also includes a controller 160 that includes sensors that sense the power characteristics of the power bus 130. The controller 160 controls each of the bus-mounted on-board circuit breakers 140 based on the sensed characteristics. The controller 160 can be a bus mounted device (as is pictured), or independently mounted and draw power from a separate source. In the case of a bus mounted controller 160, the bus-mounted on-board circuit breakers 140 and the controller 160 can be a single integrated circuit, or other form of a single electric component. The controller 160 can control the bus mounted circuit breakers 140 according to known principles to perform the circuit breaker function.

Figure 3:
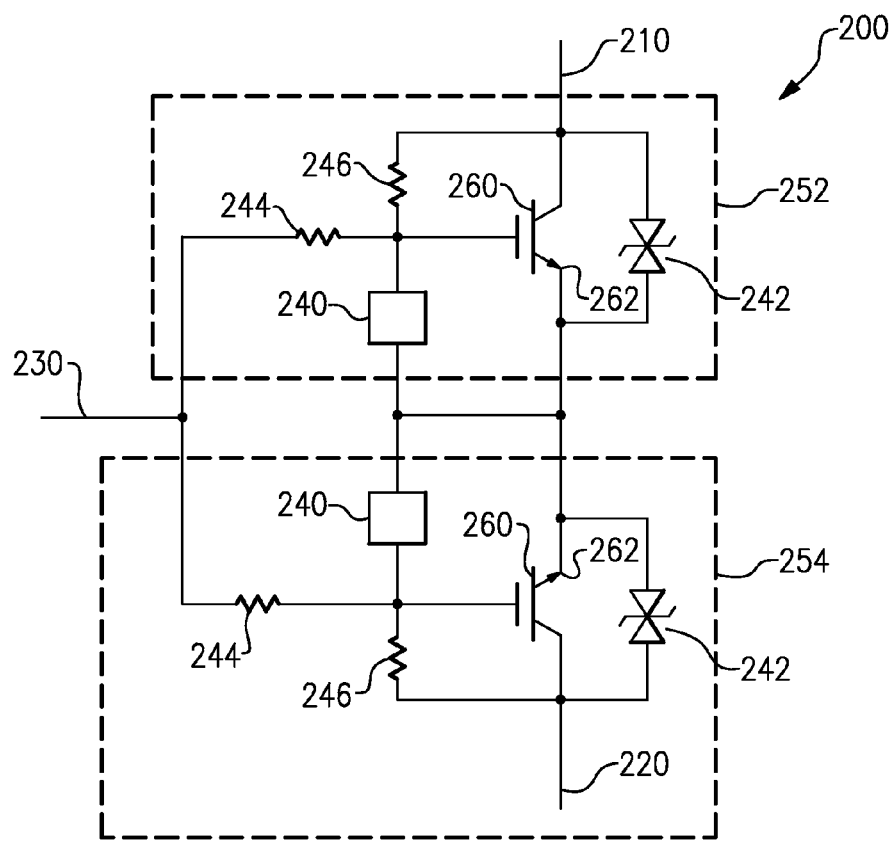
FIG. 3 illustrates an example bus mounted circuit breaker including a semi-conductor switch.

FIG. 3 illustrates an example bus-mounted on-board circuit breaker 200 (corresponding to bus-mounted on-board circuit breaker 140 in FIG. 2) with additional circuitry that allows each semi-conductor switch module 252, 254 in the bus-mounted on-board circuit breaker 200 to function as a current limiting module. The example of FIG. 3 uses two uni-directional semi-conductor switch modules 252, 254 arranged with a collector end 262 of the first module 252 transistor connected to a collector end 262 of the second module 254 transistor, thereby allowing current to flow either direction. Additionally, a Zener diode clamp 242 is connected in parallel to each of the switches 260.

Each module 252, 254 shares a single semi-conductor control signal input 230, which controls the operating state of the semi-conductor switch 260 based on the magnitude of the control current. The semi-conductor control signal originates at a controller 160 (pictured in FIG. 2). The control signal is conditioned with two conditioning resistors 244, 246, and a resistive/capacitive/Zener (RCZ) network 240 prior to affecting the control of the semi-conductor switch 260. The magnitude of the control current reaching the semi-conductor switch 260 control input determines which of three possible modes (off, linear, or on) the semi-conductor switch 260 is operating in.

Figure 4:
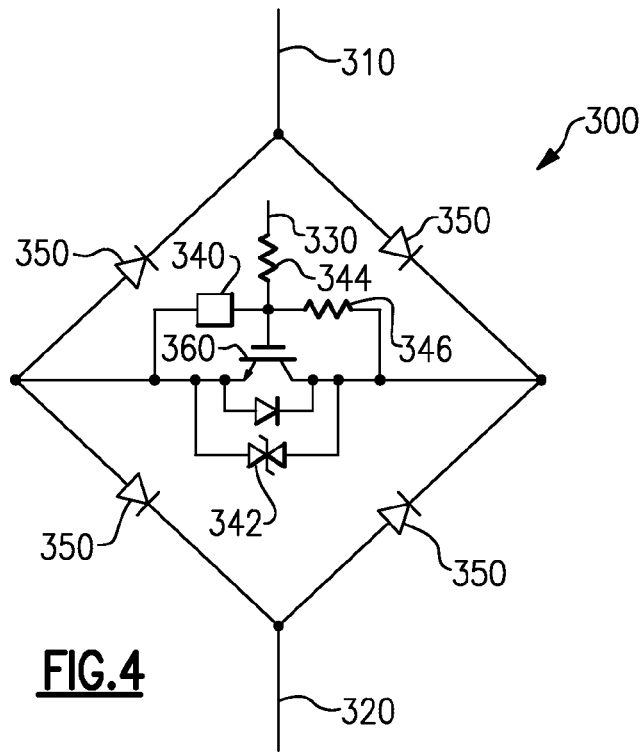
FIG. 4 illustrates an alternate example bus mounted circuit breaker including a semi-conductor switch.

An alternate bus-mounted on-board circuit breaker module 300 using a single uni-directional semi-conductor switch 360 is illustrated in FIG. 4. As with FIG. 3, a semi-conductor switch control signal 330 is conditioned by two conditioning resistors 344 and 346 as well as an RCZ element 340. A Zener diode clamp 342 is placed in parallel to the switch 360. A network of diodes 350 is also used to ensure that current will always pass through the semi-conductor switch 360 in a single direction regardless of whether the current is positive or negative. The diodes 350 are arranged in a standard bridge formation according to known techniques. As with the example of FIG. 3, the magnitude of the control current reaching the semi-conductor switch 360 determines which of the three modes the semi-conductor switch is operating in and allows the circuit breaker module 300 to function as a current limiting module.

Referring to the examples of FIGS. 3 and 4, when a control signal with a magnitude of zero reaches the semi-conductor switch 260, 360 control input the semi-conductor switch 260, 360 operates in an off mode, and no power is allowed to pass through the semi-conductor switch 260, 360. The "off" mode is utilized when the controller determines a fault is present or when the controller 160 determines that the circuit should be broken. In off mode, a corresponding electrical load 150 is isolated from the power bus 130.

When a high control current (a control signal with a magnitude exceeding a linear mode current level) reaches the semi-conductor switch 260, 360 control input, the semi-conductor switch 260, 360 operates in an on mode. In the on mode, the semi-conductor switch 260, 360 allows power to pass freely, thereby enabling a direct power path from the power source 210, 310, which is connected to the power bus 130, to the electric load 220, 320. By switching between the on and the off mode, the bus-mounted on-board circuit breaker 200 can operate as a standard circuit breaker.

The third mode of semi-conductor switch operation is a linear mode. The semi-conductor switch 260, 360 enters the linear mode when a low, non-zero, control signal is supplied on the control input 230, 330. While operating in linear mode, the semi-conductor switch 260, 360 is configured as an active resistor with an equivalent resistance of R. By operating the semi-conductor switch 260, 360 in a linear mode during a transient event, the transient current is reduced to an acceptable current level. In this way, the semi-conductor switch 260, 360 functions as a current limiter in addition to its function as a circuit breaker. This functionality can be effected by placing the semi-conductor switch 260, 360 in the linear mode when a transient event is detected, and returning the semi-conductor switch 260, 360 to an on or off mode when the transient event has ended. The transient event start and end are detected by a controller 160 (shown in FIG. 2) using transient event detection techniques known in the art.

While the gain in linear mode is fractional, the specific gain depends on the magnitude of the control signal and the resistive and capacitive values of the RC circuit 240 as described below. The presence of the RCZ 240 further enables the adjustment of the gain and affects the level of precision to match the non-linear gain curve of a semiconductor switch.

Figure 5:
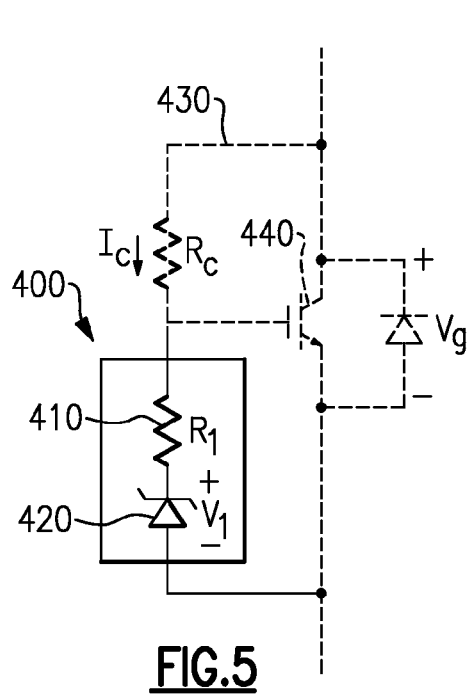
FIG. 5 illustrates an example resistive/capacitive (RC) network that can be used in the examples of FIGS. 3 and 4.

The precision of the gain control in the linear phase is determined by the RCZ 240, 340 implemented within the bus-mounted on-board circuit breaker 200, 300. FIG. 5 illustrates an example simple RC element 400 having a resistor 410 and a Zener diode 420. While the above descriptions have an RCZ element 240, 340, the simplified example omits the capacitor and thus is an RZ element. The dashed elements 430 are provided for context, and are not components of the RC element 400. The transient signal reduction (the gain) in the example of FIG. 5 is approximated as a resistor having a resistance R calculated using: $R=V_1/I_c+((R_c+R_1)/(R_1*(I_c/(V_g-V_1))))$. With $R_c$ being the collector resistor 246, 346, $R_1$ being the equivalent resistance of the resistive element of the RZ network 400, $I_c$ being the collector current, $V_g$ being the gate voltage of the semi-conductor switch 440, $V_1$ being the voltage drop across the Zener diode 420 of the RCZ element 400, and R being the equivalent resistance.

Figure 6:
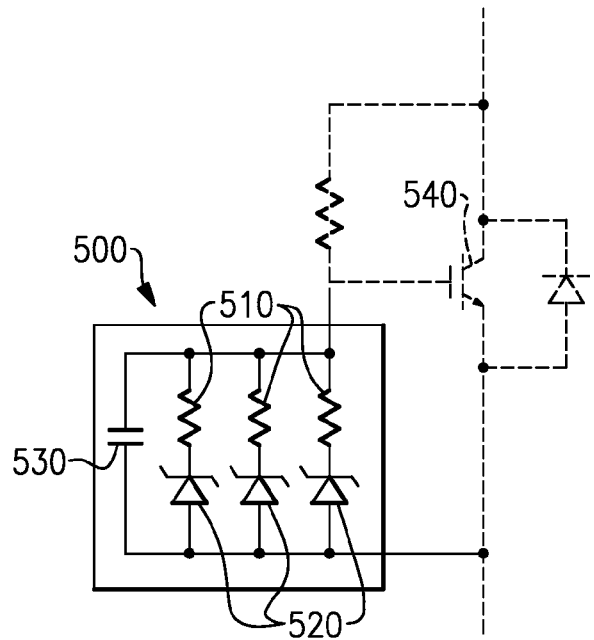
FIG. 6 illustrates an alternate example resistive/capacitive/Zener (RCZ) network that can be used in the examples of FIGS. 3 and 4.

The trans-conductance is non-linear, and the non-linearity can be alternately approximated using two or three resistor-Zener branches. An example using three resistor-Zener branches, each having a resistor 510 in series with a Zener diode 520, is illustrated in FIG. 6.

The inrush current control tolerance can be further reduced using an RC ramp up control by adding a capacitor 530 between the gate and emitter of the semiconductor switch 540. This effectively turns active resistance into a varying resistance that dominates the inrush current, thereby reducing the effects of trans-conductance tolerances.

The example gain equation of FIG. 5 is shown using IGBT's as the semi-conductor switch. Alternately, other semi-conductor arrangements, such as BJT's or MOSFETs can be used. Alterations to the formula for determining R for each of these alternate arrangements can be determined by one skilled in the art using known principles.

Although an example embodiment has been disclosed, a worker of ordinary skill in this art would recognize that certain modifications would come within the scope of the claims. For that reason, the following claims should be studied to determine their true scope and content.

What is claimed is:

1. A power distribution system comprising:
   a power bus;
   at least one power distribution branch for providing power from said power bus to an electrical system;
   a semi-conductor based circuit breaker module mounted directly to said power bus and interruptably connecting said power distribution branch to said power bus;
   a controller capable of controlling said semi-conductor based circuit breaker module in an off mode, a linear mode, and an on mode;
   wherein said semi-conductor based circuit breaker module further comprises a current limiting module such that said semi-conductor based circuit breaker module can further operate as a current limiter; and
   wherein said semi-conductor based circuit breaker module further comprises a resistor/Zener diode (RZ) network connected between a gate of a semi-conductor switch and an emitter of said semi-conductor switch, thereby allowing said semi-conductor switch to operate in a linear mode, and said at least one resistor/Zener (RZ) network comprises multiple branches, each of said multiple branches having a resistor in series with a Zener diode.

2. The power distribution system of claim 1, wherein said semi-conductor based circuit breaker module further comprises a resistor/capacitor/Zener diode (RCZ) network connected between a gate of a semi-conductor switch and an emitter of said semi-conductor switch, thereby allowing said semi-conductor switch to operate in a linear mode.

3. The power distribution system of claim 1, wherein said semi-conductor based circuit breaker module further comprises at least one uni-directional semi-conductor switch arranged such that power can pass through said semi-conductor based circuit breaker module in either a positive or negative direction.

4. A bus-mounted circuit breaker comprising:
a semi-conductor switch capable of operating in an off mode, a linear mode, and an on mode;
at least one resistor/Zener (RZ) network connected to a control input of said semi-conductor switch, thereby allowing for control of the semi-conductor switch in a linear mode and wherein said at least one resistor/Zener (RZ) network comprises multiple branches, each of said multiple branches having a resistor in series with a Zener diode;
a controller electrically coupled to said control input of said semi-conductor switch; and
wherein said semi-conductor switch interruptably connects a power input and a power output.

5. The bus-mounted circuit breaker of claim 4, wherein said semi-conductor switch comprises at least one of an Insulated Gate Bipolar Transistor (IGBT), a Metal Oxide Semiconductor Field Effect Transistor (MOSFET), and a Bipolar junction Transistor (BJT).

6. The bus-mounted circuit breaker of claim 4, wherein said RZ network is a resistive/capacitance/Zener (RCZ) network.

7. The bus-mounted circuit breaker of claim 4, wherein said circuit breaker comprises two uni-directional semi-conductor modules, each of said uni-directional semi-conductor modules having a semi-conductor switch.

8. The bus-mounted circuit breaker of claim 7, wherein a collector of a first uni-directional semi-conductor module is connected to a collector of a second semi-conductor module, thereby enabling said bus-mounted circuit breaker to operate bi-directionally.

9. The bus-mounted circuit breaker of claim 4, wherein said circuit breaker comprises a bi-directional semi-conductor module having a semi-conductor switch.

10. The bus-mounted circuit breaker of claim 9, wherein said bi-directional semi-conductor module comprises a diode bridge, wherein said semi-conductor switch connects a first diode junction and a second diode junction, and wherein each of said first and second diode junction have no other connections, thereby allowing said semi-conductor switch to operate bi-directionally.

11. The bus-mounted circuit breaker of claim 8, further comprising a Zener diode clamp, wherein said Zener diode clamp is connected in parallel to said semi-conductor switch.

12. A method for actively controlling transient/inrush currents to a load, comprising the step of operating a passive resistive/Zener (RZ) circuit, wherein said passive resistive/Zener (RZ) network comprises multiple branches, each of said multiple branches having a resistor in series with a Zener diode, and a semi-conductor switch in a linear mode, thereby eliminating a need for load side current limiters and recognizing size and space savings.

13. The method of claim 12, further comprising the operating said semi-conductor switch in an off mode when no through current is required and when a fault is detected.

14. The method of claim 12, further comprising the step of operating said semi-conductor switch in a fully-on mode as a circuit breaker or switch.

15. The method of claim 12, further comprising the steps of:
detecting a start of a transient event;
placing said semi-conductor switch in the linear mode for a duration of said transient event; and
detecting an end of said transient event.

16. The method of claim 12, wherein said step of passing said transient current through said semi-conductor switch operating in the linear mode reduces said transient current.

17. The method of claim 12, wherein said semi-conductor switch is a component of a bus-mounted semi-conductor circuit breaker.

18. The method of claim 12, wherein said passive RZ circuit is a passive resistance/capacitance/Zener (RCZ) circuit.

19. The bus mounted circuit breaker of claim 4, wherein each of said multiple branches is substantially identical.

20. The bus mounted circuit breaker of claim 4, further comprising a capacitor connected in electrical parallel to each of said multiple branches.

21. The bus mounted circuit breaker of claim 4, wherein said resistor/Zener (RZ) network connects said control input to an emitter of said semi-conductor switch.

22. The method of claim 12, wherein each of said multiple branches is substantially identical.

23. The method of claim 12, wherein the step of operating a passive resistive/Zener (RZ) circuit, wherein said passive resistive/Zener (RZ) network comprises multiple branches, each of said multiple branches having a resistor in series with a Zener diode and a semi-conductor switch in a linear mode further comprises operating a capacitor connected in electrical parallel to each of said multiple branches.

* * * * *